Aug. 6, 1957    J. E. HEJTMANEK    2,801,729
AGITATION PLATE FOR FEED HOPPER
Filed Sept. 14, 1953
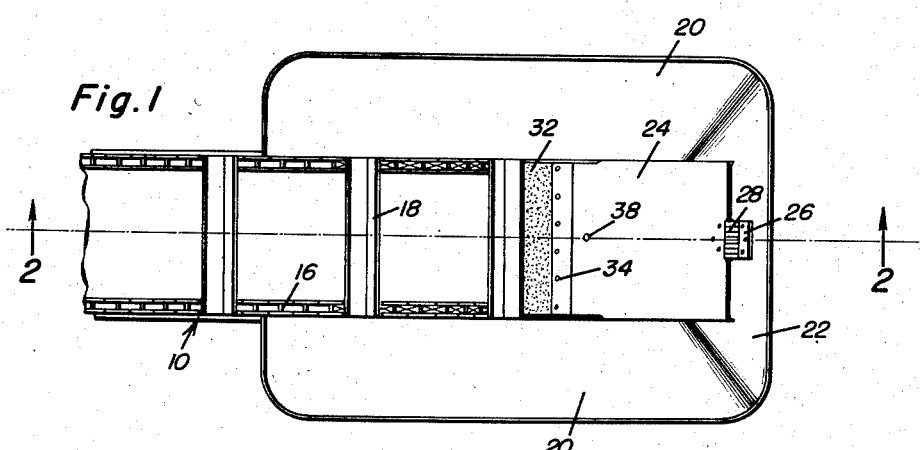
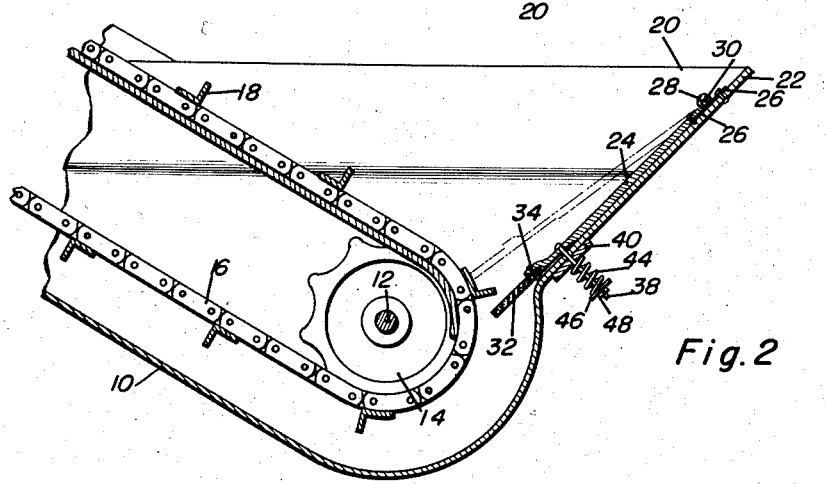
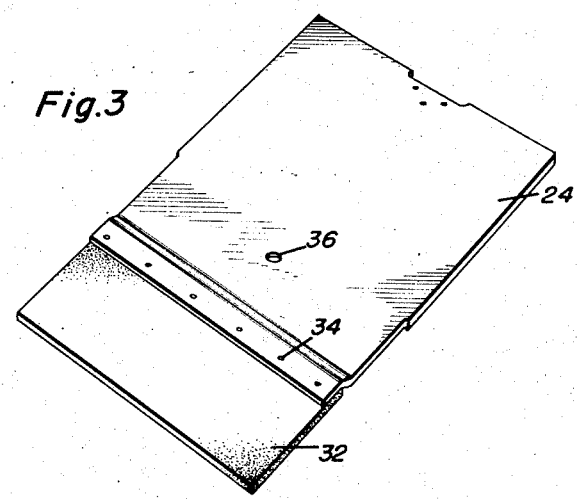
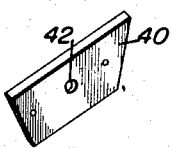
Joe E. Hejtmanek
INVENTOR.

United States Patent Office 2,801,729
Patented Aug. 6, 1957

2,801,729
AGITATION PLATE FOR FEED HOPPER

Joe E. Hejtmanek, Clarkson, Nebr.

Application September 14, 1953, Serial No. 379,781

2 Claims. (Cl. 198—53)

This invention relates to an agitation plate, and more specifically provides an attachment in the hopper of the feed of an endless conveyor.

An object of this invention is to provide an agitation plate which is pivotally attached to the inclined hopper wall and engaged by the pocket-forming slats of the endless conveyor thereby imparting motion to the plate and shaking the material to be conveyed onto the conveyor.

A further object of this invention is to provide an agitation plate having resilient means for returning the plate to its normal operating position.

Another important object of this invention is to provide an agitation plate having a rubber-like member for engaging the slats of an endless conveyor thereby providing a noiseless and long wearing arrangement.

A still further object of this invention is to provide an agitation plate for attachment to the hopper of an endless conveyor such as a corn picker elevator wherein the attachment may be easily made on existing hoppers and the device being simple in construction, easy to install and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing an endless conveyor and a hopper with the agitation plate of this invention attached to the front sloping wall of the hopper;

Figure 2 is a longitudinal, vertical section taken substantially along the section line 2—2 of Figure 1 showing the details of the endless conveyor and the agitation plate;

Figure 3 is a perspective view showing the details of construction of the agitation plate; and Figure 4 is a perspective view showing the backing plate which is attached to the outer surface of the front wall of the hopper.

Referring now more specifically to the drawings which illustrate a preferred embodiment of this invention in a corn sheller conveyor and elevator. The numeral 10 generally designates a conveyor housing having a shaft 12 rotatably journaled therein and suitable gears 14 supported thereon to support an endless conveyor 16 of the chain type having spaced upstanding slats 18 which form pockets for carrying the material along the upper surface of the endless conveyor 16.

As best seen in Figure 2, the housing 10 has a hopper with side walls 20 and a front wall 22 with all of the walls sloping inwardly and downwardly toward the endless conveyor. The agitation plate 24 of this invention is pivotally secured to the front wall 22 by a pair of hinge plates 26 having hinge barrels 28 in aligned relation and a hinge pin 30 inserted through the hinge barrels 28 thereby forming a hinge member with the hinge plates 26 secured to the front wall 22 and the agitation plate 24 respectively. Attached to the agitation plate 24 at a point remote from the hinge plates 26 is a rubber-like flap member 32 secured to the plate 24 by suitable fastening means such as rivets 34. It will be seen that the rubber flap 32 projects into the path of the upstanding slats 18 wherein as the slats pass around the gears 14 the flap 32 is engaged and the plate 24 is moved outwardly into a position shown in phantom in Figure 2. As the slats 18 progress upwardly along the line of the conveyor the flap becomes disengaged and returns to its normal position parallel to and lying against the inner surface of the front wall 22 of the hopper. At a point between the hinge plate 26 and the flap 32 an aperture 36 is bored on the center line of the plate 24 for receiving a bolt 38 which passes therethrough and thence through the front wall 22 of the hopper. A backing plate 40 is secured on the outer surface of the front wall 22 and has a centrally located aperture 42 for receiving the bolt 38. A compression spring 44 surrounds said bolt 38 and abuts the backing plate 40 and is held on the plate by a suitable washer 46 and an adjusting nut 48 wherein the tension of the spring 44 may be adjusted.

The operation of the device will be readily understood. The material to be carried by the conveyor 16 is placed in the hopper and falls onto the conveyor and carried thereon by the pocket forming slats 18. As the slats 18 pass the bottom of the hopper it engages flap 32 and lifts the agitation plate 24 thereby shaking the material onto the conveyor 16. The compression spring 44 acting on the bolt 38 returns the plate 24 to its original position in an obvious manner. Obviously, the plate 24 may be made of any suitable sheet material and the rubber flap 32 constructed of any long-wearing rubber-like material.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. The combination of an elevator including a housing containing an endless conveyor provided with spaced and upstanding slats forming material carrying pockets and a hopper for receiving material and guiding it into said conveyor, said hopper including an open top and outwardly flared side and front walls, a rigid agitator plate pivotally secured to said inclined front wall, said plate projecting into the path of said slats and temporarily lifted and released thereby pivoting said plate about said pivotal connection, said pivoted connection located remote from said slats, and spring means tensionally supported exteriorly of the hopper and connected to the plate adjacent the free end of the latter and returning said plate with impacting force against said front wall when released by said slats.

2. The combination as defined in claim 1 whereby said plate has a resilient slat engaging portion projecting outwardly beyond the free end of the plate.

References Cited in the file of this patent
UNITED STATES PATENTS

| | | |
|---|---|---|
| 467,683 | Essex | Jan. 26, 1892 |
| 2,021,094 | Wigginton | Nov. 12, 1935 |
| 2,581,720 | Schulte | Jan. 8, 1952 |

FOREIGN PATENTS

| | | |
|---|---|---|
| 6,996 | Great Britain | 1907 |